(12) United States Patent
Tanaka

(10) Patent No.: US 7,127,795 B2
(45) Date of Patent: Oct. 31, 2006

(54) ROTOR ASSEMBLY AND METHOD FOR MAKING THE ROTOR ASSEMBLY

(75) Inventor: Naoto Tanaka, Miyota-machi (JP)

(73) Assignee: Minebea Co., Ltd., Miyota-machi (JP)

( * ) Notice: Subject to any disclaimer, the term of this patent is extended or adjusted under 35 U.S.C. 154(b) by 25 days.

(21) Appl. No.: 11/047,604

(22) Filed: Feb. 2, 2005

(65) Prior Publication Data

US 2005/0127770 A1    Jun. 16, 2005

Related U.S. Application Data

(62) Division of application No. 10/156,775, filed on May 29, 2002, now Pat. No. 6,920,683, which is a division of application No. 09/624,861, filed on Jul. 24, 2000, now Pat. No. 6,467,150, which is a division of application No. 09/310,353, filed on May 12, 1999, now abandoned.

(30) Foreign Application Priority Data

Jan. 7, 1999    (JP) .................. 11-001863

(51) Int. Cl.
*H02K 15/02* (2006.01)
*H02K 15/10* (2006.01)

(52) U.S. Cl. .................. 29/598; 29/596; 29/597; 310/42; 310/211

(58) Field of Classification Search .......... 29/596–598, 29/729, 733–735; 310/40 MM, 42, 49 R, 310/156.22, 156.28, 156.31
See application file for complete search history.

(56) References Cited

U.S. PATENT DOCUMENTS

| 4,067,101 A | 1/1978 | Ono |
| 4,182,026 A | 1/1980 | Searle |
| 4,406,958 A | 9/1983 | Palmero et al. |
| 4,503,368 A | 3/1985 | Sakamoto |
| 4,528,473 A | 7/1985 | Tezuka |
| 4,541,204 A | 9/1985 | Reneau |
| 4,714,850 A | 12/1987 | Akiba et al. |
| 4,850,322 A | 7/1989 | Uthoff |
| 4,920,292 A | 4/1990 | Albrecht et al. |
| 4,980,595 A | 12/1990 | Arora |
| 5,073,735 A | 12/1991 | Takagi |
| 5,076,023 A | 12/1991 | Saguchi |
| 5,121,017 A | 6/1992 | Yamamoto et al. |

(Continued)

FOREIGN PATENT DOCUMENTS

JP    A 61-150656    7/1986

(Continued)

*Primary Examiner*—Minh Trinh
(74) *Attorney, Agent, or Firm*—Oliff & Berridge, PLC

(57) ABSTRACT

A rotor assembly and method for making the rotor assembly in which a cylindrical magnet which is magnetized in an axial direction is coupled with a rotary shaft and the magnet is clamped with rotor stacks formed by laminating annular magnetic plates, the surfaces of which are electrically insulated, to form a rotor, and around the outer circumference of the rotor stator cores which are wound with stator coil are disposed, a sleeve is pressed in between the magnet and the rotor stacks, and the rotary shaft and interposed therebetween. The cutting operation for the outer diameter of the rotor during the manufacturing processes is carried out while holding both ends of the sleeve, subsequently, the rotary shaft is inserted, thereby, regardless of the length of the rotary shaft, the manufacturing processes are carried out to reduce the number of the molds.

1 Claim, 4 Drawing Sheets

U.S. PATENT DOCUMENTS

| | | |
|---|---|---|
| 5,270,604 A | 12/1993 | Sandel et al. |
| 5,315,751 A | 5/1994 | Hammer |
| 5,463,262 A | 10/1995 | Uchida |
| 5,548,174 A | 8/1996 | Siga et al. |
| 5,845,390 A | 12/1998 | Cheng |
| 5,846,126 A | 12/1998 | Marvin |
| 6,201,324 B1 | 3/2001 | Suzuki |
| 6,467,150 B1 * | 10/2002 | Tanaka ........................ 29/598 |
| 6,920,683 B1 * | 7/2005 | Tanaka ........................ 29/598 |

FOREIGN PATENT DOCUMENTS

| | | |
|---|---|---|
| JP | A 61-199455 | 9/1986 |
| JP | A 06-225510 | 8/1994 |
| JP | A 06-253512 | 9/1994 |
| JP | 07-322594 A | 12/1995 |

* cited by examiner

F I G. 1
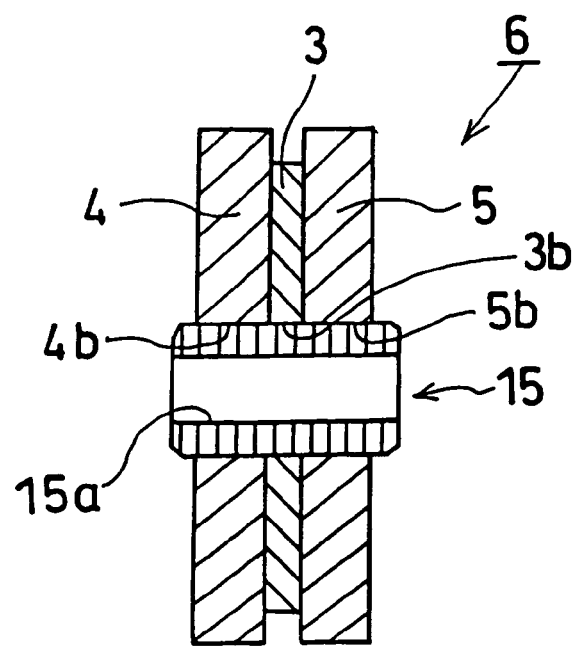
F I G. 2
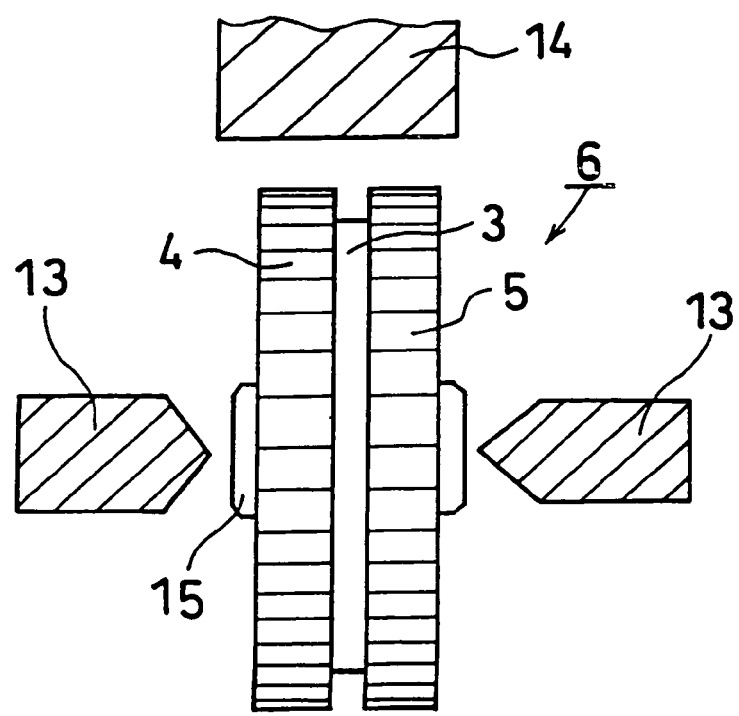

ROTOR ASSEMBLY AND METHOD FOR MAKING THE ROTOR ASSEMBLY

This is a Division of application Ser. No. 10/156,775 filed May 29, 2002 now U.S. Pat. No. 6,920,683, which in turn is a Division of application Ser. No. 09/624,861, filed Jul. 24, 2000, now U.S. Pat. No. 6,467,150 B1 issued Oct. 22, 2002, which in turn is a Division of application Ser. No. 09/310,353, filed May 12, 1999, now abandoned. The entire disclosure of the prior applications is hereby incorporated by reference herein in their entireties.

BACKGROUND OF THE INVENTION

1. Field of Invention

The present invention relates to an improvement of a stepping motor, in particular, a rotor of it which is called as a hybrid type.

2. Background of Related Art

The structure of a stepping motor of this kind is explained referring to FIG. 3. On a rotor shaft 2, a magnet 3 magnetized in an axial direction is fixed by being inserted by the rotor shaft 2 in a hole 3a, and both surfaces of which are clamped with a rotor stacks 4, 5 formed by being laminated with annular magnetic plates (silicon steel) surfaces of which are electrically insulated, thereby, a rotor 6 is formed. The rotor stacks 4, 5 are also inserted by the rotor shaft 2 through holes 4a, 5a provided in the center thereof.

The rotor shaft 2 of the rotor 6 is supported rotatably on casings 9, 10 by bearings 7, 8. And, at the outer circumference side of the rotor 6, a stator core 12 wound with a stator coil 11 is disposed, which is clamped with the casings 9, 10.

FIG. 4 is a plan view where the rotor 6 is inserted in the stator coil 12 and FIG. 5 is a perspective view of the stator core 12. The stator core 12 is approximately square in its outer configuration, and at a center opening thereof a plurality of projection poles 12a directed toward the center respectively. Around the projection poles 12a the stator coil 11 is wound. This stator core 12 formed with a plurality of magnetic plates laminated. These magnetic plates laminated are connected by being inserted with bolts not shown through the holes 12b provided at their 4 corners.

As shown in FIG. 4, on the projection pole 12a, a plurality of minute pole teeth 12c are provided, and on the rotor stacks 4, 5 of the rotor 6 too, a plurality of pole teeth 3t are provided opposing the pole teeth 12c. The spacing between these pole teeth 12c and 3t is minute in dimension of less than 30 μm. Since at this minute spacing the rotor 6 rotates, normally it has been necessary to be worked by cutting the outer diameter of the rotor 6 after being assembled. That is, according to the conventional manufacturing process of the rotor 6, the rotor 6 has been assembled in such a manner as the rotor stacks 4, 5 which are formed by being laminated with the electrically insulated magnetic plates (silicon steel plates) and the magnet 3 which is a component of the rotor 6 are assembled on the rotor shaft 2 simultaneously by the processes of press-in and gluing to obtain the rotor 6 as shown in FIG. 6.

On both ends of the rotor shaft 2, central holes (not shown) are provided in their axial directions, and, the outer diameter cutting has been carried out by the following processes in such a manner, as shown in FIG. 7, the concentricity is secured by being inserted with the center hole holding apparatus 13 of the outer diameter cutting machine and touched in its outer diameter with a grinding stone 14 for use of outer diameter cutting.

In a conventional manufacturing method of the rotor, the rotor stacks and the magnet as components of the rotor are pressed in and glued on the rotary shaft simultaneously. However, since the length of each rotary shaft is different respectively in accordance with its use of the stepping motor, even if the rotor stacks and the magnet are common, a manufacturing lot controlling as a rotor can not arranged, so that the production of the rotor has been carried out per every lot of various kind of rotors.

In the case where the rotor stack, the magnet and the rotary shaft are molded in a unit, since the length of the rotary shafts is different, there have needed various kind of molds and have been difficulties in both of manufacturing of the rotor and managing of the molds. Further, when using a magnetic material as the rotary shaft, in the case where the rotor stacks are mounted directly on the rotary shaft, the leakage of the magnetic bundle of the magnet occurs through the N-pole of the magnet, one rotor stack, the rotary shaft, the other rotor stack and the S-pole of the magnet, a non-magnetic material had to be used as the rotary shaft. Therefore, there have been remained some anxieties for the rotation precision and the durability.

The present invention is to provide a stepping motor in which such problems as mentioned above in the conventional stepping motor are improved.

SUMMARY OF THE INVENTION

The present invention is, according to a first aspect of the present invention, characterized in that, in a stepping motor in which a magnet which is a cylindrical and magnetized in its axial direction is coupled on a rotary shaft, both surfaces of which are clamped with rotor stacks formed by laminating annular magnetic plates the surface of which is electrically insulated to form a rotor and a stator core around of which a stator coil is wound is disposed around the outer circumference of the rotor between the rotary shaft, and the magnet and the rotor stacks a non-magnetic sleeve is interposed.

Further, according to a second aspect of the present invention, the length of the sleeve in the first aspect described above is projected axially out of the rotor stacks disposed on both sides of the magnet.

In a third aspect of the present invention, said sleeve, the magnet and the rotor stacks provided on both sides thereof described in the first aspect are solidified by being molded with a resin in a unit.

By thus forming the rotor, the cutting process of the outer diameter of the rotor (rotor assembly) which is not mounted on the rotary shaft yet becomes possible.

BRIEF DESCRIPTION OF THE DRAWINGS

FIG. 1 is a sectional view of a rotor according to one embodiment of the present invention.

FIG. 2 is a sectional view showing the time when the outer diameter of what is shown in FIG. 1 is cut.

DETAILED DESCRIPTION OF PREFERRED EMBODIMENTS

Figure 3:
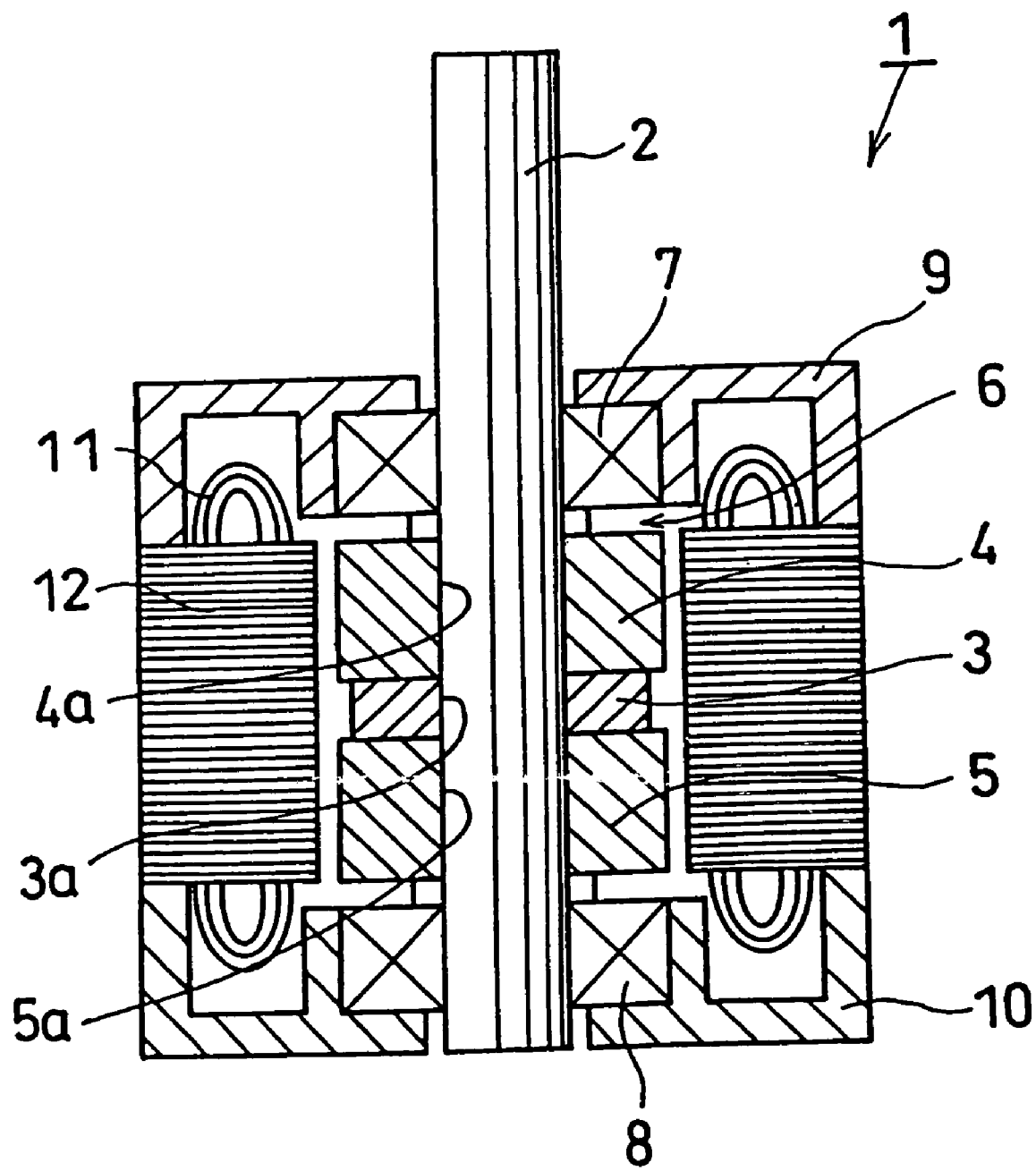
FIG. 3 is a sectional view of a stepping motor to be applied by the present invention.
Figure 4:
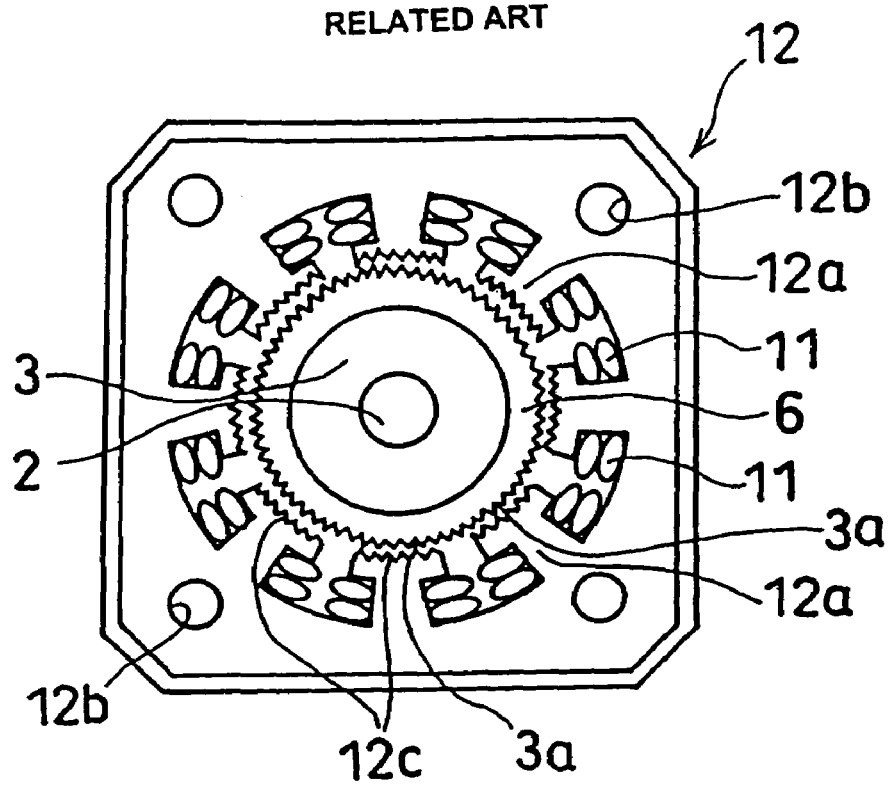
FIG. 4 shows a stator core of what is shown in FIG. 3.
Figure 5:
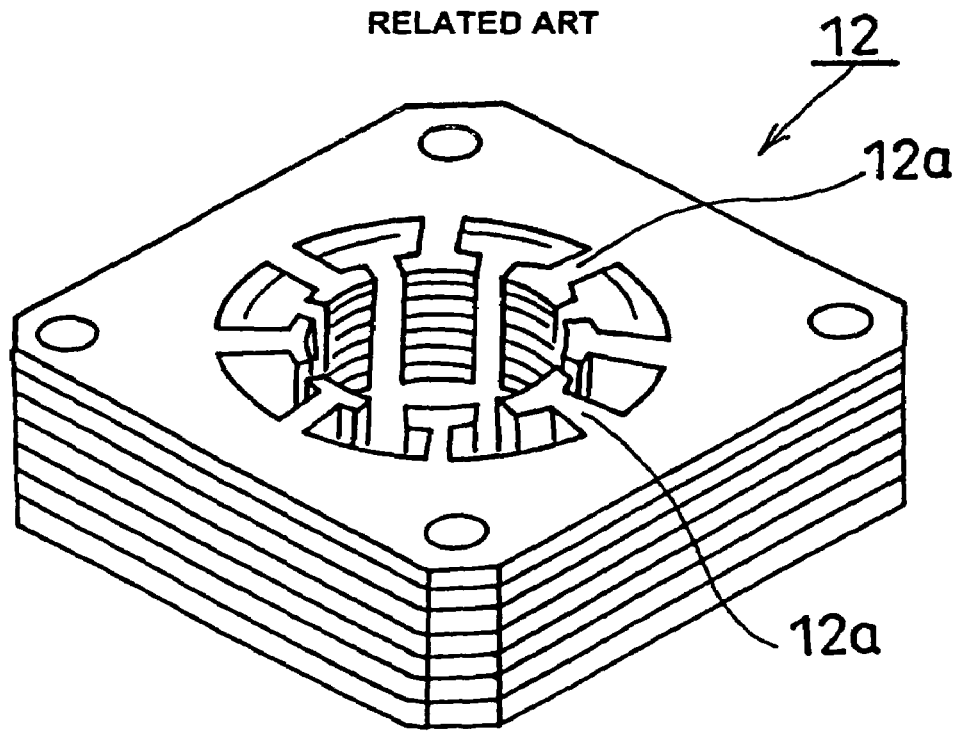
FIG. 5 is a perspective view of what is shown in FIG. 4.
Figure 6:
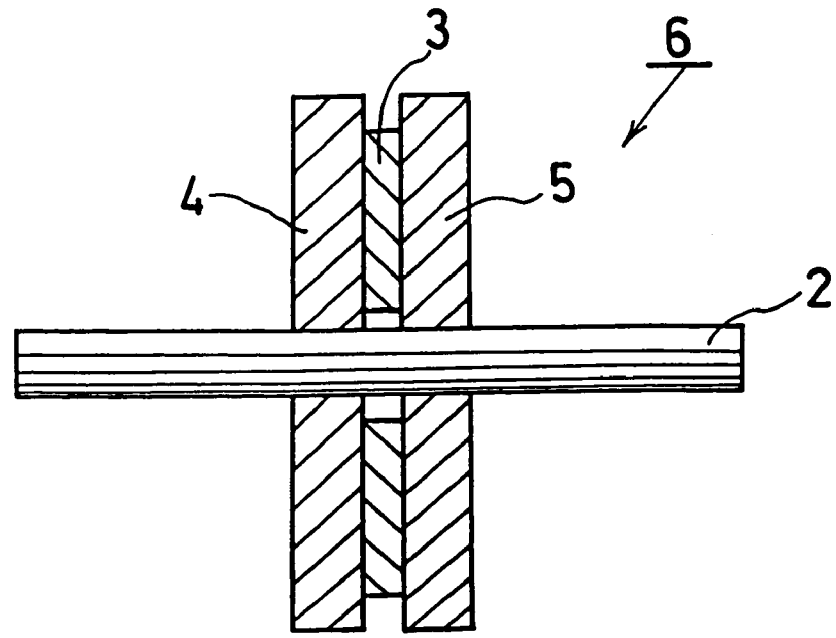
FIG. 6 is a sectional view of a rotor of the conventional stepping motor.
Figure 7:
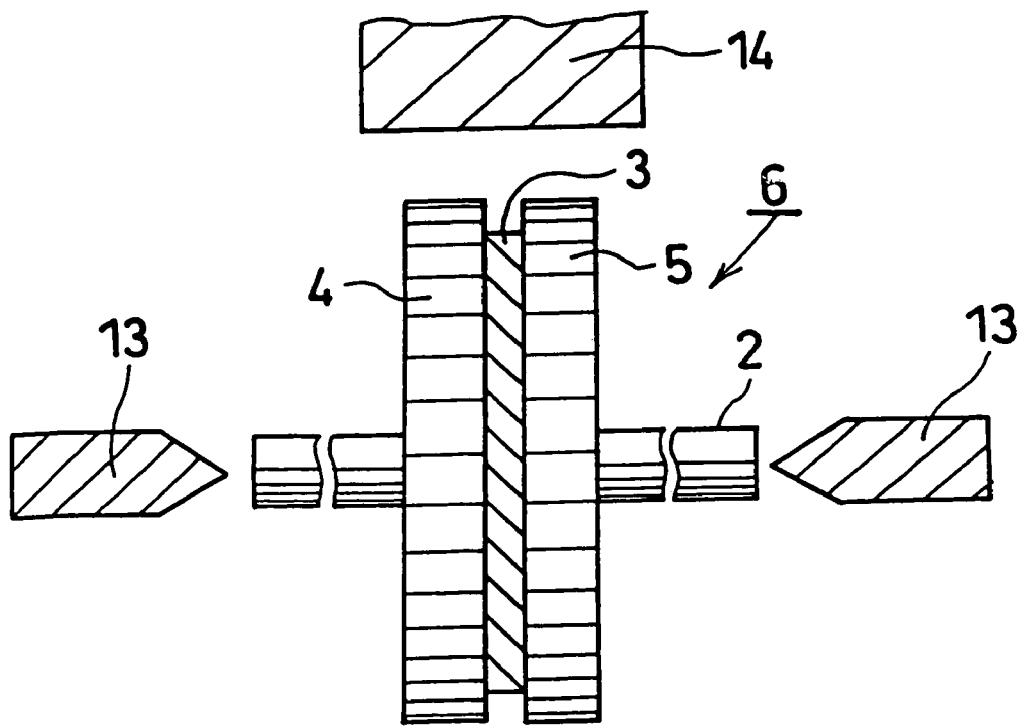
FIG. 7 is a sectional view showing the time when the outer diameter of the rotor of the conventional stepping motor is cut.

Hereinafter, an embodiment of the present invention will be described based on FIG. 1. In the present invention, the holes 3b, 4b and 5b pierced at the center of the magnet 3, the rotor stacks 4 and 5 respectively are adapted to become larger in diameter compared with the previous mentioned holes 3a, 4a and 5a respectively, in which the non-magnetic sleeve 15 having the length to the extent where both ends thereof are projected out of the rotor stacks axially is pressed in while interposing therebetween.

The portions except the rotary shaft 2 of the rotor 6, thus after the sleeve 15 is inserted, is formed by being molded with a resin in a unit. In order to press in the sleeve 15, the outer diameter dimension is adapted to be approximately identical with the above holes 3a, 4a and 5a, the dimension of hole 15a keeps a concentricity in a high precision with the outer diameter.

As shown in FIG. 2, in the hole 15a thus constructed, a center hole maintaining apparatus 13 of an outer diameter cutting apparatus is inserted to set the concentricity in a high precision, and a grinding stone 14 for use of outer diameter cutting is gotten in touch with the outer circumference of the rotor 6 and the outer circumference is cut in such a manner as it becomes a given dimension. After finishing the cutting, a rotary shaft 2 having the length suitable for that use is pressed in the hole 15a and glued to form the rotor 6.

Thus, according to this structure, regardless of the length of the rotary shaft 2, the outer diameter can be worked by cutting.

Since the present invention is a stepping motor thus structured, according to a first aspect of the invention, and the outer diameter cutting work of the rotor which is not assembled with the rotary shaft can be carried out, it is greatly effective in the light of a process control. And, since, regardless of the length of the rotary shaft the cutting work of the outer diameter can be carried out, the kind of the mold which is used for manufacturing the rotor can be reduced.

Further, since the non-magnetic sleeve prevents the magnetic flux from leaking, as the material to be used for the rotary shaft, it is not limited to a non-magnetic material but a magnetic material also can be used. Further, in the 2nd aspect of the present invention, since the length of the sleeve is set in such a manner as it is projected in the axial direction from the rotor stacks disposed on both sides of the magnet, when the length of the sleeve is prolonged as long as possible, a decrease of the mechanical strength of the rotor due to the miniaturization of the stepping motor can be supplemented.

Further, in the third aspect of the present invention, since the sleeve, the magnet provided on its outer circumference and the rotor stacks are solidified by molding of a resin in a unit, at the time of cutting work of the diameter a displacement between the rotor stacks and the magnet is not generated to ease the cutting work.

What is claimed is:
1. A rotor assembly, comprising:
a magnet having a through hole;
a pair of rotor stacks, a rotor stack on each side of the magnet and each rotor stack having a through hole;
a sleeve inserted into and through the through holes in the magnet and the pair of rotor stacks; and
a rotor shaft inserted into the sleeve, wherein the sleeve is non-magnetic and the rotor assembly is made by a method of:
  (a) clamping both sides of the magnet magnetized in axial direction with the pair of rotor stacks provided with pole teeth on outer circumferences thereof and formed by laminating electrically insulated magnetic plates;
  (b) inserting the non-magnetic sleeve through the through holes in the magnet and the rotor stacks;
  (c) solidifying the magnet, the rotor stacks and the sleeve with a resin in a unitary manner;
  (d) inserting a center hole maintaining apparatus of an outer diameter grinding apparatus into ends of a hole passing through the sleeve;
  (e) grinding the outer circumferences of the rotor stacks with a grinding stone of the diameter grinding apparatus until the outer circumferences of the rotor stacks become a predetermined outer diameter;
  (f) pressing a rotary shaft having a predetermined length into the sleeve; and
  (g) gluing the rotary shaft to the sleeve.

* * * * *